United States Patent [19]
Arnold

[11] 3,931,670
[45] Jan. 13, 1976

[54] APPARATUS AND METHOD FOR CONNECTING TWO AXIALLY SPACED APART PIPES

[75] Inventor: James F. Arnold, Houston, Tex.

[73] Assignee: HydroTech International, Inc., Houston, Tex.

[22] Filed: Apr. 25, 1974

[21] Appl. No.: 464,105

[52] U.S. Cl.............. 29/157 R; 61/72.1; 61/72.3; 166/.5; 166/.6; 285/DIG. 23
[51] Int. Cl.² .......................................... F16L 1/04
[58] Field of Search.......... 29/428, 429, 200 P, 237, 29/157 R; 269/48.1, 49, 50, 52; 61/63, 69, 72.1, 72.3; 285/18, 23, 24, 27, 33, 95, 96, 285/98, 322–323, DIG. 22, 23; 166/.5, .6

[56] References Cited
UNITED STATES PATENTS

| | | | |
|---|---|---|---|
| 3,383,122 | 5/1968 | Richardson | 166/.5 X |
| 3,645,563 | 2/1972 | Rochelle | 166/.6 X |
| 3,729,941 | 5/1973 | Rochelle | 61/72.3 |
| 3,751,932 | 8/1973 | Matthews | 61/72.1 |
| 3,830,509 | 8/1974 | Weber | 269/48.1 |
| 3,835,655 | 9/1974 | Oliver | 166/.6 X |
| 3,842,612 | 10/1974 | Arnold | 285/18 X |

*Primary Examiner*—C. W. Lanham
*Assistant Examiner*—Joseph A. Walkowski

[57] ABSTRACT

A releasable pull plug arranged for mounting inside the end of one of the pipes or conduits with the plug having clips for disengageably engaging the internal surface of one of the conduits and locking the plug against axial movement relative thereto. A line is attached to the plug and extends axially through the other conduit for exerting a pulling force thereon whereby the two conduits may be drawn together by pulling on the line. The plug is provided with fluid pressure actuated release means for disengaging the clips, and means are provided for applying pressurized fluid to the release means to thereby release the plug. Means are also provided which are operable in response to the activation of the release means for holding the locking means in the disengaged position independently of the fluid pressure, whereby the plug after release may be withdrawn through the other conduit by pulling on the line. The plug may include means for sealing the end of the conduit in which the plug is mounted.

The method includes the steps of installing a releasable pull plug inside the end of one of the conduits, with the plug being arranged to release in response to application of fluid pressure thereto. A line is attached to the plug and is extended through the other conduit. Thereafter, a tension force is applied to the line to draw the two pipe ends together, after which a fluid pressure is applied to the plug to thereby release the plug. The fluid pressure is relieved, and the released plug is then withdrawn from the conduits by pulling on the line.

16 Claims, 7 Drawing Figures

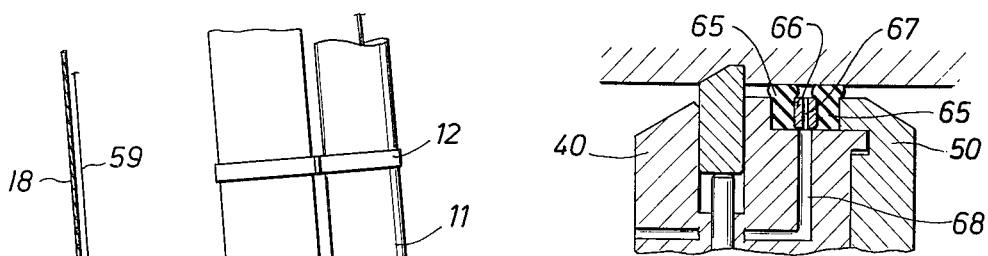
FIG. 7
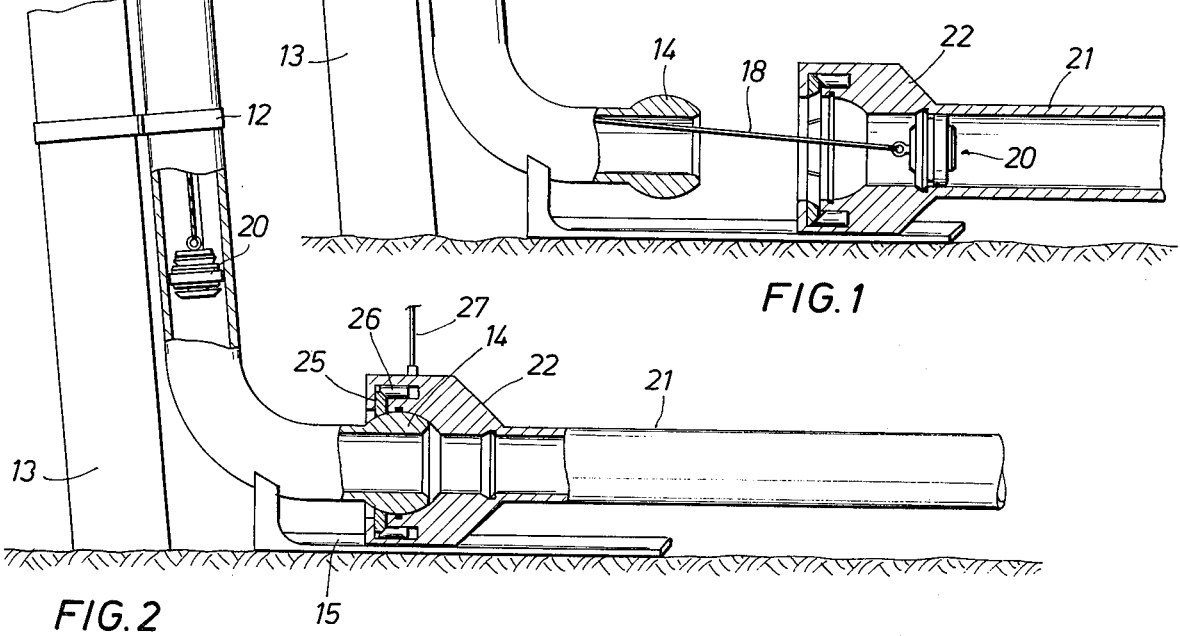
FIG. 1
FIG. 2
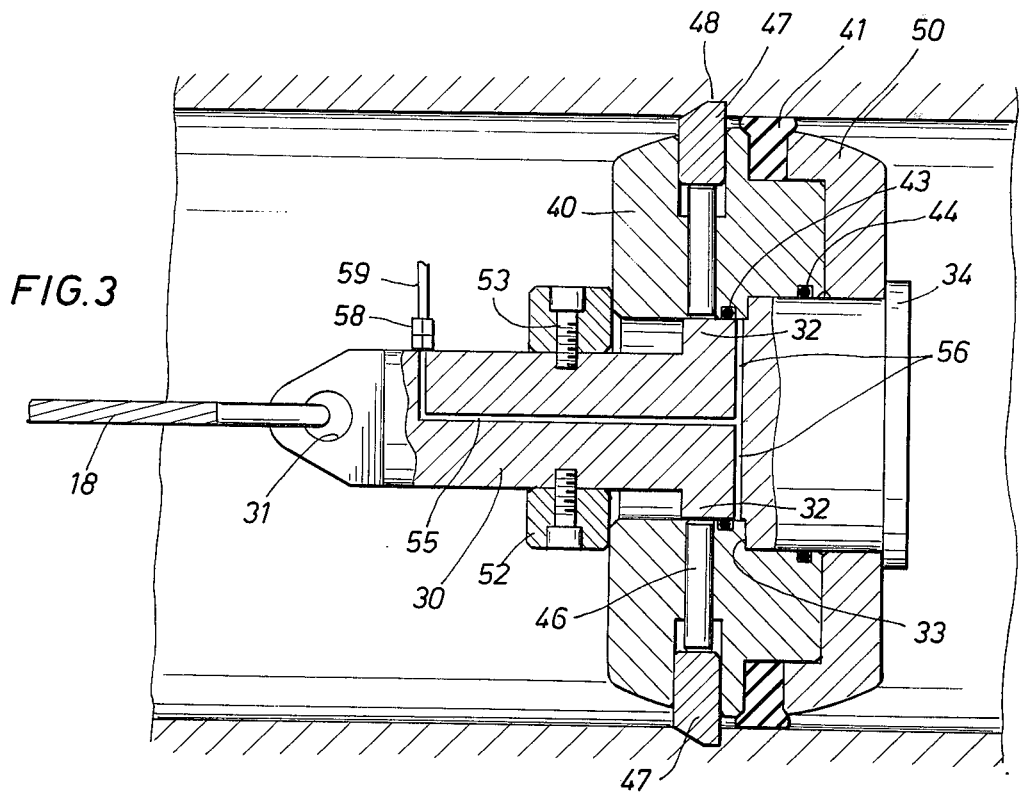
FIG. 3

APPARATUS AND METHOD FOR CONNECTING TWO AXIALLY SPACED APART PIPES

BACKGROUND OF THE INVENTION

1. Field of the Invention

This invention generally relates to an apparatus and method for drawing together two generally axially spaced apart pipes, whereby the two ends can then be joined in a hostile environment, for example, as in underwater or sub-sea locations.

2. Description of the Prior Art

When installing a pipeline on the sub-sea floor, it is often desirable to connect such sub-sea pipeline with a pipeline riser that extends upwardly on a drilling platform or the like. However, it is very difficult, time consuming, and expensive to effect a pipeline connection with a riser pipe in a sub-sea location because of the depth of the water, the wave action, poor visibility and the like. Heretofore, no fully satisfactory solution has been provided for making such an underwater connection and thereafter easily withdrawing the connection means with a minimum of effort.

SUMMARY OF THE INVENTION

It is therefore an object of this invention to provide an improved apparatus and method for drawing together the ends of two generally axially spaced apart conduits. The apparatus in its broadest sense includes a releasable pull plug arranged for mounting inside the end of one of the conduits, with the plug having means for disengageably engaging the internal surface of the conduit and locking the plug against axial movement relative thereto. Preferably, the plug is provided with a mandrel on which is mounted, for relative axial movement, a body member. A line is attached to the plug and extended axially through the other pipe for exerting a pulling force thereon whereby the two conduit ends may be drawn together by pulling on the line. Fluid pressure actuated release means are provided in the plug for releasing the locking means upon actuation thereof. The invention also includes means operable in response to the activating of the release means for holding the locking means in the disengaged position independently of the fluid pressure. Means are also supplied for applying the pressurized fluid to the release means to thereby release the plug, whereby the plug after release thereof may be withdrawn through the other conduit by pulling on the line. Preferably the apparatus also includes seal means supported by the plug and cooperative therewith for sealing the end of the conduit in which the plug is mounted. The seal means is preferably of the resilient type which is arranged for radial deformation in response to axial pressure.

Briefly stated, the method of this invention includes installing a releasable pull plug inside the end of one of the conduits, with the plug being arranged to release in response to the application of fluid pressure thereto. A line is attached to the plug and extended through the other conduit. A tension force is then applied to the line to thereby draw the two conduit ends together. The plug is released by applying fluid pressure thereto. Fluid pressure is thereafter removed and the plug is withdrawn from the conduit by pulling on the line. Preferably, the plug is locked in the end of the pipe by supporting clips in engagement with the inside of the pipe, and the clips are continuously urged to the release position independently of fluid pressure. The conduit ends may have supported thereof mating coupling members, such as ball and socket connectors, which are interconnected when they are moved and guided to the mating position.

BRIEF DESCRIPTION OF THE DRAWINGS

FIG. 1 is a generally schematic side elevation view showing the apparatus arranged for interconnecting a horizontally extending pipe with a riser pipe, which may be attached to an off-shore platform leg, for example.

FIG. 2 is a view similar to FIG. 1 but showing the pipe interconnected with the riser pipe and the pull plug being removed up the riser pipe.

FIG. 3 is a generally cross-sectional view of the pull plug of this invention shown in the actuated or engaging position.

FIG. 7 is a fragmentary sectional view of an alternate embodiment arranged for testing of the seal means.

DESCRIPTION OF THE PREFERRED EMBODIMENT

Figure 4:
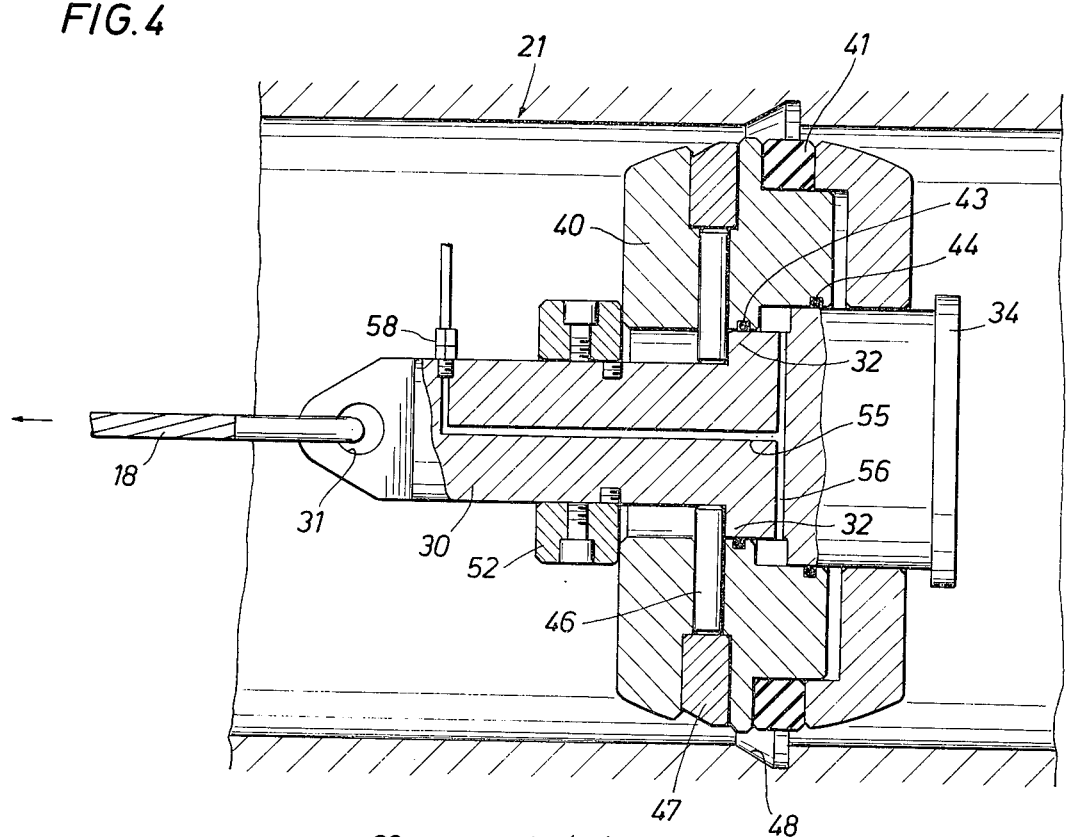
FIG. 4 is a view similar to FIG. 3 but showing the pull plug in the de-actuating or disengaged position and withdrawn to the left from the engaged position.

Referring now to the drawings, and in particular to FIG. 1 initially, a riser pipe 11 is generally shown attached as by clamp 12 to a leg 13 of an offshore platform. The lower end of riser pipe 11 is shown having a ball 14 attached thereto and, in addition, a guide trough 15 may also be attached thereto and extend proximately along the sub-sea floor, as shown. Riser pipe 11 has a line in the form of cable 18 passing downwardly therethrough, which cable is attached to a releasable pull plug of this invention designated generally by the numeral 20. Pull plug 20 will be described in greater detail hereinafter. However, it should be noted that it is arranged for engaging the internal surface of generally horizontally extending pipe 21 which is to be interconnected with riser pipe 11. Pipe 21 has mounted thereon a coupling member which is arranged for mating with ball 14, which coupling member is in the form of socket 22, which is arranged to seal with and otherwise lock and engage with ball 14. Preferably ball and socket connectors 14 and 22 are hydraulically actuated connectors and of the type sold by Hydro-Tech Services, Inc. of Houston, Tex., under the brand name HYDROBALL. However, it is to be understood that other mating coupling members can be used, as for example, mating flanges or the like. However, the ball and socket arrangement is preferred because of its ability to accommodate substantial misalignment, which may occur between the pipes to be connected.

Referring now to FIG. 2, it is to be understood that socket 22 is provided with a plurality of radially movable slips 25 which are arranged to engage the rearward side of ball 14 upon actuation. Slips 25 are arranged for actuation by axially movable cam piston 26 which is arranged to move axially in response to hydraulic pressure applied on hydraulic line 27. Hence, ball 14 and socket 22 are arranged to cooperatively interconnect pipes 11 and 21 and seal the same for fluid flow therethrough, as is generally shown in FIG. 2.

Figure 5:
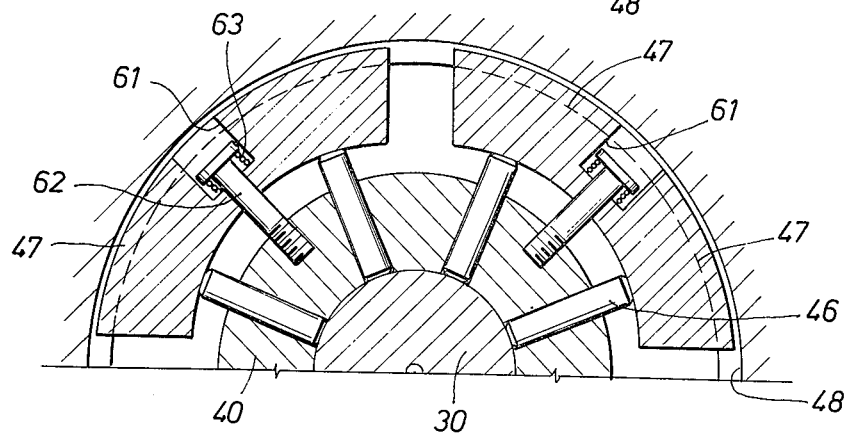
FIG. 5 is a partial cross-sectional view of the pull plug as shown in FIG. 2 and showing the pipe engaging clips in the extended or engaging position.

Referring now to FIGS. 3 and 5 in particular, pull plug 20 is initially mounted inside of pipe 21 in a convenient work environment, as for example, above sea level, and thereafter pipe 21 and pull plug 20 are lowered to the sub-sea location with socket 22 being supported on guide trough 15 as shown in FIG. 1. In the event no trough 15 is used, then the lower end of riser pipe 11 would be provided with a mud cover, through which cable 18 would extend. Such cover would, of course, be removed before making the final connection.

Pull plug 20 is of the releasable type and is responsive to fluid actuation to the released position. Pull plug 20 is comprised of a mandrel 30 having a cable eye 31 at one end thereof for connection to cable 18, and at the opposite end thereof is provided with a first enlarged portion forming an annular shoulder 32 and a second, radially enlarged portion forming annular shoulder 33 and a third annular portion forming end plate 34.

Mandrel 30 has mounted thereon for axial sliding movement therewith annular plug body 40. The right end of plug body 40, as shown in FIGS. 3 and 4, is provided with a radially reduced outer portion about which is mounted an annular, resilient, elastomeric seal 41, which is arranged for sealing engagement with the internal surface of pipe 21 in response to axial deformation thereof. The internal bore of plug body 40 is of enlarged diameter on the right end thereof, as shown in FIGS. 3 and 4, so as to form a shoulder which generally mates with shoulder 33 of mandrel 30. In addition, the internal bore of plug body 40 is provided with a pair of annular recesses 43 and 44 in each of which is mounted an O-ring seal to provide seals between plug body 40 and mandrel 30. Other types of seals could, of course, be used.

Figure 6:
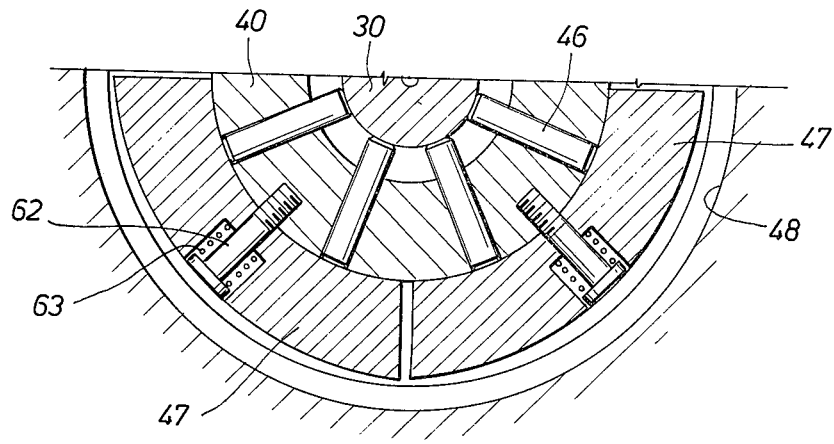
FIG. 6 is a half-sectional view similar to FIG. 5 but showing the pipe engaging clips in the retracted position as shown in FIG. 4.

Plug body 40 also has provided therein a plurality of radially extending bores, in each of which is mounted a generally radially extending keeper pin 46, the radially inward ends of which abut against mandrel 30. As shown in FIG. 3, the radially outward end of each of the keeper pins 46 abut against the radially inward end of a pull clip 47. The radially outward edges of pull clip 47 are arranged for engagement in annular recess 48 provided in the internal surface of pipe 21 to facilitate locking engagement therewith. As best shown in FIGS. 5 and 6, clips 47 are biased radially inwardly by spring means such that when mandrel 30 is moved axially to the right relative to plug body 40 and pins 46 clear shoulder 32, then pull clips 47 are retracted radially inwardly from the engaged position. Each of the clips 47 is provided with a radially extending recess 61 on the outward periphery thereof, and extend radially inwardly therethrough. Each recess 61 has mounted therein a bolt 62 which extends radially into and is threadably engaged with body 40. Each bolt 40 has supported under the head thereof a spring 63, which abutts against a shoulder in the recess and is arranged to continuously urge the respective clips 47 radially inward, to thus serve as means for holding clips 47 out of engagement with recess 48. Other bias means would, of course, be provided to supply this function.

Annular seal 41 is arranged for axial compression and thereby radial deformation to the sealed position shown in FIG. 3 by being compressed between plug body 40 and thrust ring 50, which has a portion which engages annular seal 41 as shown. Ring 50 is mounted about mandrel 30 and is spaced between plug body 40 and end plate 34, as shown.

Clips 47 and seal 41 are held in the engaged or actuated position as shown in FIG. 3 by virtue of retainer disc 52, also mounted about mandrel 30 and held there by plurality of shear pins 53 which extend into mandrel 30. Shear pins 53 are selected so as to provide the desired amount of resistance to axial force exerted between plug body 40 and mandrel 30.

Pull plug 20 is arranged to be actuated to the released position by the application of pressurized fluid thereto. Means for applying the pressurized fluid include a fluid port 55 which passes through mandrel 30 at a point axially spaced apart from retainer disc 52 and communicates through branch ports 56 to the annular space between recesses 43 and 44 and between shoulders 33 of mandrel 30 and the mating shoulder of plug body 40. Hence, upon the application of fluid pressure through ports 55 and 56, fluid pressure is applied to shoulder 33, which causes plug body 40 and mandrel 30 to be urged axially apart. Continued application of fluid pressure through port 55 and the associated conduit means will result in a build-up of fluid pressure to the point that shear pins 53 are ruptured, thereby permitting mandrel 30 to move to the right relative to disc 52, as shown in FIG. 4, which thereby permits clips 47 and keeper pins 46 to be released by being retracted radially inwardly past shoulder 32, thereby releasing pull plug 20 from the set position. In addition, it will be understood that plug body 40 and ring 50 are thereafter allowed to separate, thereby disengaging or unsealing annular seal 41 which, because of its resilient nature, will revert to the non-deformed or unsealed position.

It is to be understood that fluid pressure may be applied to ports 55 and 56 in one of at least two different means or methods. For example, port 55 may be connected with an adapter 58, which in turn is connected to a hydraulic line 59, which extends upwardly through riser pipe 11 along with cable 18. Hence, by the application of fluid pressure on line 59 after the pipes 11 and 21 have been interconnected, pull plug 20 may be released as aforesaid. Alternatively, port 55 may be in communication directly with the fluid inside of pipe 11, and in which event fluid pressure can simply be applied through riser pipe 11, which pressure then acts through port 55 and its associated elements to cause release of pull plug 20 in the same manner as described above. After release of the plug 20, pressure in the pipe is then relieved, except as to any head pressure which may be present.

For purposes of convenience, the term "locking means" may sometimes be used herein to describe certain portions of the present embodiment of the invention including clips 47, pins 46 and that portion of mandrel 30 which is axially adjacent shoulder 32. In addition, the term "release means" may sometimes be used to describe certain other portions of the present invention and including shoulder 32 of mandrel 30 which permits movement of pins 46 radially therepast and shoulder 33 of mandrel 30 and the adjacent shoulder of body 40 which together form the pressure chamber to which fluid pressure is applied through parts 55 and 56 to urge mandrel 30 and body 40 axially apart.

In using the present embodiment of this invention, riser pipe 11 would normally be installed on platform leg 13 at the time that the platform is installed in the sub-sea location, or may be added subsequently. In addition, cable 18 may be installed extending downwardly through riser pipe 11, with the lower end thereof extending upwardly to the surface or platform. Riser pipe 11 may also have ball 14 and guide trough 15 welded or otherwise attached thereto.

Thereafter, pipe 21 may be held in the above-sea location with socket 22 welded or otherwise attached therewith. At this point, pull plug 20 can be installed in the end of pipe 21 generally in the set position shown in FIG. 3, with clips 47 engaging annular recess 48 and with annular seal 41 sealing the end of pipe 21 to avoid incursion of sea water and the like during installation. During assembly, a temporary cone-shaped member (not shown) may be placed over the mandrel to provide an inclined ram to facilitate movement of pins 46 to the radially outward position shown, while body 40 and mandrel 30 are drawn together.

Thereafter, pipe 21 and accompanying socket 22 can be lowered in the water to rest upon guide trough 15 in the manner shown in FIG. 1. Application of tensional force on cable 18 will draw the ends of pipes 11 and 21 axially together such that ball 14 and socket 22 are drawn to the mating position. Thereafter, by the application of hydraulic pressure on fluid line 27, piston 26 of ball 22 is moved axially to thereby cause engagement of slips 25 with ball 14, which operation is accompanied by the sealing of the two elements, i.e., ball 14 and socket 22. If preferred, the hydraulic fluid may be displaced with an epoxy resin to provide a permanent connection of socket 22 and ball 14.

Thereafter, fluid pressure can be applied either downwardly through pipe 11 as heretofore described or down hydraulic line 59 through port 55 to thereafter cause release of pull plug 20 as heretofore described. Upon release of pull clips 47 as described, pull plug 20 is withdrawn upwardly through riser pipe 11 by taking up on cable 18 as shown in FIG. 2, thus completing the installation of the interconnection of the two conduits. Continued application of fluid pressure is not required to keep the clips 47 in the retracted position. Hence, plug 20 can be removed with a minimum of effort.

It is to be understood that seal 41 of releasable plug 20 is useful in serving a number of functions. By sealing the end of pipe 21, the successful connection of ball 14 and socket 22 can be pressure tested by applying fluid pressure down pipe 21. The pressure applied for testing purposes can be maintained for some period of time below the pressure level at which shear pins 53 are sheared, and the pressure can thereafter be increased to cause shearing of pins 53, causing release of the plug. Further, by having the end of pipe 21 sealed as aforesaid, fluid pressure can be applied directly down pipe 11 and through port 55 of plug 20 without the necessity for having a separate hydraulic line 59 as described above.

Radial deformable seal 41 allows for greater space tolerance between the outside of plug 20 and the inside of pipe 11 so that it may be readily pulled therethrough after release. Referring now to FIG. 7, an alternate embodiment of the sealing means is shown. In this embodiment, two axially spaced apart annular resilient seals 65 are mounted between body 40 and thrust ring 50. Seals 65 are spaced on opposite sides of an annular test ring 66 which has a radial port 67 which communicates with another conduit 68 provided in body 40. Hence, upon application of pressurized fluid through conduit 68, the effectiveness of seals can be determined when the tool is initially assembled. Thereafter, conduit 68 may be plugged, if desired, or may be left open to facilitate separation of body 40 and ring 50 during the release sequence.

It will thus be observed that the art has been provided with a relatively simple apparatus and method for accomplishing a relatively difficult underwater pipe connection. The connection is accomplished by leaving the conduit unobstructed with a full axial bore therethrough. The operation can generally be carried out remotely without necessity for having divers on the sub-sea location, or if divers are used, their use is reduced to a minimum. The apparatus and method provides for a safe, efficient, convenient, and easily operated system to complete the interconnection of two pipes in a difficult working environment. The plug can be withdrawn without the necessity of maintaining pressure on the plug. Stated otherwise, the plug is provided with means which positively keep it in the disengaged condition once it is released, as described above, which greatly facilitates removal thereof.

Further modification and alternative embodiments of the apparatus and method of this invention will be apparent to those skilled in the art in view of this description. Accordingly, this description is to be construed as illustrative only and is for the purpose of teaching those skilled in the art the manner of carrying out the invention It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In apparatus of drawing together the ends of two generally axially spaced apart conduits, the combination comprising:
   a releasable pull plug arranged for mounting inside the end of one of said conduits, said plug having means for disengageably engaging the internal surface of said one conduit and locking said plug against axial movement relative thereto;
   a line attached to said plug and extendable through said other conduit for exerting a pulling force thereon, whereby said two conduit ends may be drawn together by pulling on said line;
   fluid actuated release means provided in said plug for disengaging said locking means from said conduit upon actuation thereof;
   means operable in response to the actuation of said release means for holding said locking means in the disengaged position independently of said fluid pressure;
   and means for applying pressurized fluid to said release means to thereby release said plug, whereby said plug after release thereof, and with said locking means held in said disengaged position, may be withdrawn through said other conduit by pulling on said line.

2. The invention as defined in claim 1 wherein:
   said locking means includes a plurality of clips circumferentially spaced about said plug for disengageably engaging an annular recess in the internal wall of said one conduit.

3. The invention as defined in claim 2 wherein:

said holding means includes means for biasing said clips towards said disengaged position.

4. The invention as defined in claim 2 and further including:
seal means mounted on said plug for effecting a seal between said plug and said one conduit when said clips are disposed in said recess engaging position.

5. In apparatus for drawing together the ends of two generally axially spaced apart conduits, the combination comprising:
a releasable pull plug arranged for mounting inside the end of one of said conduits, said plug having a mandrel with a body mounted on said mandrel for relative movement therewith;
means supported by said plug for disengageably engaging the internal surface of said conduit and locking said plug against axial movement therein;
an annular resilient seal mounted axially adjacent a portion of said body for sealing with the internal surface of said conduit upon axial compression thereof;
an annular thrust ring mounted on said mandrel and generally axially adjacent said body, said thrust ring having an annular portion which is cooperative with said body for axially compressing and radially deforming said seal to said sealing position when said locking means are engaged with said conduit;
said plug including fluid pressure actuated release means movable between a set position in which said locking means are held in the conduit engaging position and a release position in which said locking means are released from engagement with said one conduit in response to relative axial movement between said mandrel and body;
means for attaching a line to said mandrel, which line is extendable through said other conduit for exerting a pulling force thereon, whereby said two conduit ends may be drawn together by pulling on said line;
and means for applying pressurized fluid to said release means to thereby cause axial movement between said mandrel and body to release said locking means, whereby said plug, after release of said locking means, may be withdrawn through said other conduit by pulling on said line.

6. The invention as claimed in claim 5 wherein:
said locking means includes a plurality of circumferentially spaced clips arranged for engaging an annular recess in the internal surface of said conduit.

7. The invention as claimed in claim 5 including:
means supported by said plug for resisting relative movement between said mandrel and said body until said fluid pressure exceeds a predetermined extent.

8. The invention as claimed in claim 5 including:
bias means supported by said plug for urging said locking means radially inwardly toward the release position.

9. The invention as claimed in claim 5 including:
another annular resilient seal supported generally axially adjacent said first seal;
an annular testing ring mounted between said seals, said testing ring having radial port means therethrough for applying fluid pressure to the space between said seals to thereby test said seals;
and conduit means communicating with said port means through said plug for applying fluid pressure thereto.

10. The invention as claimed in claim 5 including:
means operable in response to the activation of said release means for holding said locking means in the disengaged position independently of said fluid pressure.

11. Apparatus for connecting together the ends of two spaced apart conduits, the combination comprising:
ball and socket members mounted on said conduit ends, said ball member being mateably engageable with said socket member to permit relative misalignment between said conduits and to secure said conduits together;
a releasable pull plug arranged for mounting inside the end of one of said conduits, said plug having means for disengageably engaging the internal surface of said one conduit and locking said plug against axial movement relative thereto;
a line attached to said plug and extendable through said other conduit for exerting a pulling force thereon, whereby said ball and socket members may be drawn together in mating engagement as aforesaid by pulling on said line;
fluid pressure actuated release means provided in said plug for disengaging said locking means from said conduit upon actuation thereof;
means operable in response to the actuation of said means for holding said locking means in the disengaged position independently of said fluid pressure;
and means for applying pressurized fluid to said release means to thereby release said plug, whereby said plug after release thereof, and with said locking means held in said disengaged position, may be withdrawn through said other conduit by pulling on said line.

12. The invention as defined in claim 11 wherein:
said locking means includes a plurality of clips circumferentially spaced about said plug for disengageably engaging an annular recess in the internal wall of said one conduit.

13. The invention as defined in claim 12 wherein:
said holding means includes means for biasing said clips towards said disengaged position.

14. The invention as defined in claim 12 and further including:
seal means mounted on said plug for effecting a seal between said plug and said one conduit when said clips are disposed in said recess engaging position.

15. In a method of drawing together the ends of two generally axially spaced apart conduits, the combination comprising:
installing a releasable pull plug inside the end of one of said conduits, said plug being releasable in response to the application of fluid pressure thereto;
attaching a line to said plug and extending said line through said other conduit;
applying a tension force on said line to thereby draw said two conduit ends together;
applying fluid pressure to said plug to thereby release said plug;
relieving said fluid pressure, with said plug remaining in said released condition;
and withdrawing said released plug from said conduits by pulling on said line, while said fluid pressure is relieved.

16. The invention as claimed in claim 15 wherein:
said plug is held in said one conduit end by supporting a plurality of clips about the periphery of said plug and engaging siad clips in a recess about the internal surface of said one conduit end; and including positively urging said clips to the disen-gaged position while said fluid pressure is relieved to thereby facilitate withdrawal of said plug.

* * * * *